United States Patent
Lee et al.

(10) Patent No.: US 9,716,991 B2
(45) Date of Patent: Jul. 25, 2017

(54) COMPUTING SYSTEM WITH DETECTION MECHANISM AND METHOD OF OPERATION THEREOF

(71) Applicant: Samsung Electronics Co., Ltd., Gyeonggi-Do (KR)

(72) Inventors: Sung Hyuck Lee, San Jose, CA (US); James M. A. Begole, Los Altos, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 67 days.

(21) Appl. No.: 14/021,514

(22) Filed: Sep. 9, 2013

(65) Prior Publication Data

US 2015/0074253 A1 Mar. 12, 2015

(51) Int. Cl.
  H04J 3/16 (2006.01)
  H04W 8/00 (2009.01)
  H04W 4/02 (2009.01)

(52) U.S. Cl.
  CPC ............ *H04W 8/005* (2013.01); *H04W 4/023* (2013.01)

(58) Field of Classification Search
  CPC ............................. H04W 4/023; H04W 8/005
  USPC ............................. 707/739, E17.018, E17.046
  See application file for complete search history.

(56) References Cited

U.S. PATENT DOCUMENTS

| | | | | |
|---|---|---|---|---|
| 7,050,793 B1* | 5/2006 | Kenward | .......... | H04W 36/0011 341/60 |
| 8,812,013 B2* | 8/2014 | Agarwal | ............... | G01S 5/0263 455/127.4 |
| 8,880,051 B2* | 11/2014 | Ghosh | ..................... | H04L 29/08 455/41.2 |
| 2005/0234735 A1* | 10/2005 | Williams | ................ | G06F 21/10 726/29 |
| 2006/0133320 A1* | 6/2006 | Kim | ................. | H04W 36/0055 370/331 |
| 2006/0258289 A1* | 11/2006 | Dua | ........................... | 455/41.3 |
| 2007/0110009 A1* | 5/2007 | Bachmann | .......... | H04L 12/2856 370/338 |
| 2007/0259717 A1* | 11/2007 | Mattice | ............... | A63F 3/00157 463/36 |
| 2008/0022003 A1* | 1/2008 | Alve | ..................... | G01S 5/0009 709/229 |

(Continued)

FOREIGN PATENT DOCUMENTS

WO  2005069139 A1  7/2005

OTHER PUBLICATIONS

RFC 4067_Context Transfer Protocol (CXTP).*
Oh et al., An Acoustic-based Relative Positioning System for Multiple Mobile Devices, 2009, 1-6, IEEE, Seoul, Korea.

*Primary Examiner* — Khaled Kassim
*Assistant Examiner* — Berhanu Belete
(74) *Attorney, Agent, or Firm* — IP Investment Law Group

(57) ABSTRACT

A computing system includes: a context module configured to determine a transfer context for invoking a state transfer between a source device and a target device; a modulation module, coupled to the context module, configured to generate a transfer modulation based on the transfer context for adjusting to a modulation scheme suited for the transfer context; and a transmission module, coupled to the modulation module, configured to send a communication packet based on the transfer modulation for detecting the source device and the target device.

20 Claims, 7 Drawing Sheets

(56) References Cited

U.S. PATENT DOCUMENTS

| | | | |
|---|---|---|---|
| 2008/0204410 A1* | 8/2008 | Wilson | G06F 3/0346 345/158 |
| 2009/0216906 A1* | 8/2009 | Weniger | H04L 41/147 709/246 |
| 2009/0265470 A1 | 10/2009 | Shen et al. | |
| 2010/0105409 A1* | 4/2010 | Agarwal | G01S 5/0263 455/456.1 |
| 2010/0254322 A1* | 10/2010 | Liao et al. | 370/329 |
| 2010/0278345 A1* | 11/2010 | Alsina et al. | 380/283 |
| 2011/0047557 A1* | 2/2011 | Koskimies | 719/315 |
| 2011/0070834 A1* | 3/2011 | Griffin | G06K 7/0008 455/41.1 |
| 2011/0070837 A1* | 3/2011 | Griffin | H04B 5/0062 455/41.3 |
| 2011/0163944 A1* | 7/2011 | Bilbrey | G01D 21/02 345/156 |
| 2011/0237193 A1* | 9/2011 | Shen | G06F 1/1694 455/41.2 |
| 2011/0310851 A1* | 12/2011 | Klingenbrunn et al. | 370/332 |
| 2012/0047156 A1* | 2/2012 | Jarvinen | G06F 17/30023 707/758 |
| 2012/0117456 A1* | 5/2012 | Koskimies | G06F 9/45512 715/224 |
| 2012/0136865 A1* | 5/2012 | Blom | G06F 17/30141 707/739 |
| 2012/0198353 A1* | 8/2012 | Lee | G06F 3/017 715/748 |
| 2013/0054706 A1* | 2/2013 | Graham et al. | 709/206 |
| 2013/0065526 A1* | 3/2013 | Pottier | H04L 67/34 455/41.2 |
| 2013/0169434 A1* | 7/2013 | McCown | G08B 21/00 340/540 |
| 2013/0170380 A1 | 7/2013 | Hassan et al. | |
| 2013/0174237 A1* | 7/2013 | Zises | G06F 21/32 726/7 |
| 2013/0212212 A1* | 8/2013 | Addepalli et al. | 709/217 |
| 2013/0217332 A1* | 8/2013 | Altman | H04H 60/90 455/41.2 |
| 2013/0237251 A1* | 9/2013 | Suzuki | H04W 4/02 455/456.2 |
| 2013/0275373 A1* | 10/2013 | Uola | H04L 67/1095 707/634 |
| 2013/0282438 A1* | 10/2013 | Hunter | G01S 1/02 705/7.32 |
| 2013/0312071 A1* | 11/2013 | Raman | G06F 21/32 726/6 |
| 2013/0332848 A1* | 12/2013 | Lam | G06F 3/017 715/751 |
| 2013/0340086 A1* | 12/2013 | Blom | G06F 21/6245 726/26 |
| 2014/0006402 A1* | 1/2014 | Lee | H04L 67/1063 707/737 |
| 2014/0066058 A1* | 3/2014 | Yu | H04L 67/16 455/434 |
| 2014/0141714 A1* | 5/2014 | Ghosh | H04L 29/08 455/39 |
| 2014/0277843 A1* | 9/2014 | Langlois | H04M 1/6091 701/2 |
| 2014/0280580 A1* | 9/2014 | Langlois | H04W 4/005 709/204 |
| 2014/0347188 A1* | 11/2014 | Alameh | G08B 21/182 340/686.6 |

* cited by examiner

COMPUTING SYSTEM WITH DETECTION MECHANISM AND METHOD OF OPERATION THEREOF

TECHNICAL FIELD

An embodiment of the present invention relates generally to a computing system, and more particularly to a system for detection mechanism.

BACKGROUND

Modern portable consumer and industrial electronics, especially client devices such as navigation systems, cellular phones, portable digital assistants, and combination devices are providing increasing levels of functionality to support modern life including information sharing services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Thus, a need still remains for a computing system with detection mechanism for aiding the management of task and information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system including: a context module configured to determine a transfer context for invoking a state transfer between a source device and a target device; a modulation module, coupled to the context module, configured to generate a transfer modulation based on the transfer context for adjusting to a modulation scheme suited for the transfer context; and a transmission module, coupled to the modulation module, configured to send a communication packet based on the transfer modulation for detecting the source device and the target device.

An embodiment of the present invention provides a method of operation of a computing system including: determining a transfer context for invoking a state transfer between a source device and a target device; generating a transfer modulation with a control unit based on the transfer context for adjusting to a modulation scheme suited for the transfer context; and sending a communication packet based on the transfer modulation for detecting the source device and the target device.

An embodiment of the present invention provides a non-transitory computer readable medium including: determining a transfer context for invoking a state transfer between a source device and a target device; generating a transfer modulation based on the transfer context for adjusting to a modulation scheme suited for the transfer context; sending a communication packet based on the transfer modulation for detecting the source device and the target device; and determining a device authorization based on the communication packet for executing the state transfer between the source device and the target device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
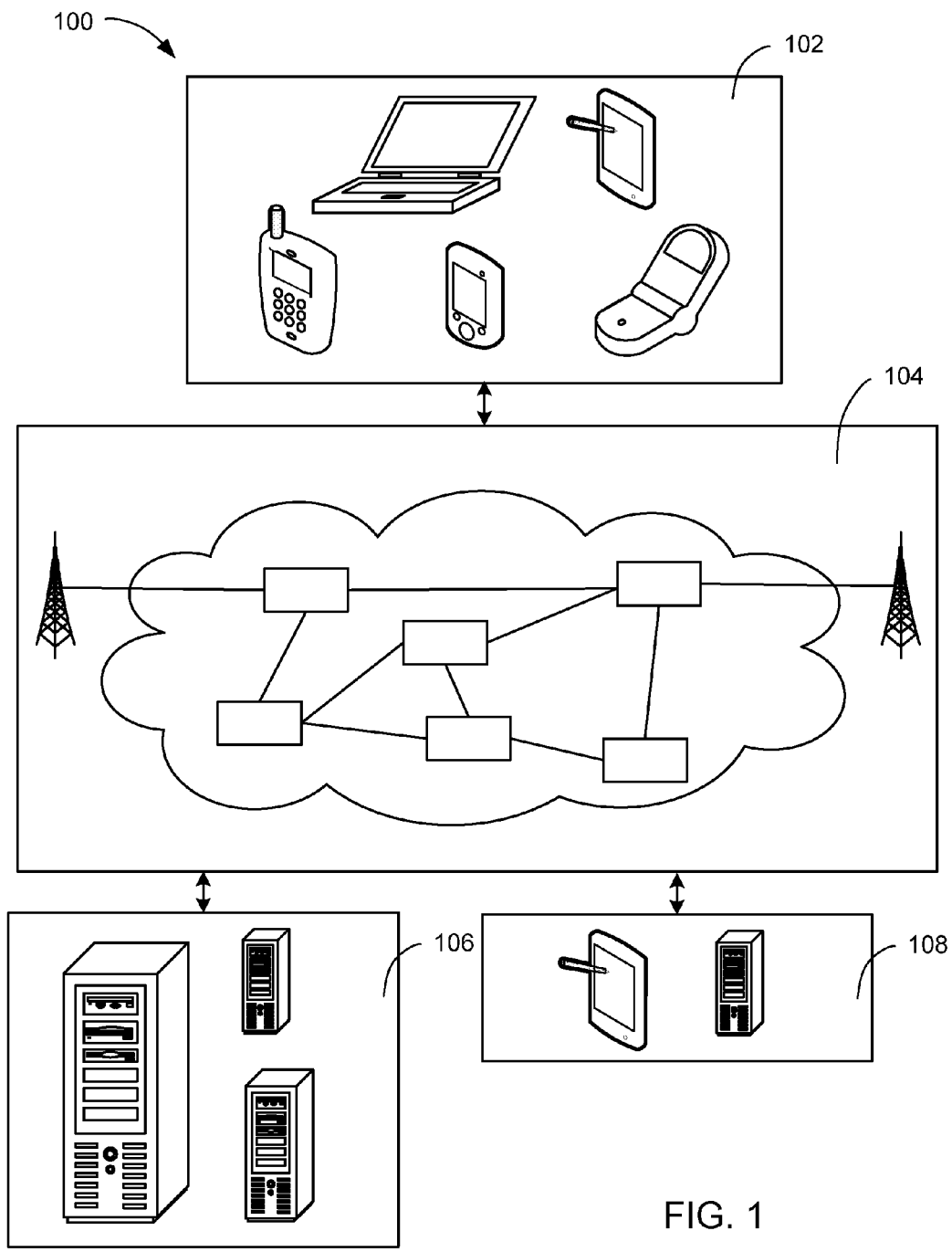
FIG. 1 is a computing system with detection mechanism in an embodiment of the present invention.

An embodiment of the present invention generates a transfer modulation and determines a packet type to detect a source device and a target device for invoking a state transfer between the two devices. A transfer context can be determined to generate the transfer modulation and determine the packet type best suited to detect the source device and the target device. As a result, a device authorization can be determined to execute a state transfer between the source device and the target device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with detection mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network. The computing system 100 can also include a third device 108 connected to the first device 102, the second device 106, or a combination thereof with the communication path 104. The third device 108 can be a client or server.

For example, the first device 102 or the third device 108 can be of any of a variety of display devices, such as a cellular phone, personal digital assistant, wearable digital device, tablet, notebook computer, television (TV), automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the computing system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the computing system 100 is shown with the second device 106 and the first device 102 or the third device 108 as end points of the communication path 104, although it is understood that the computing system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
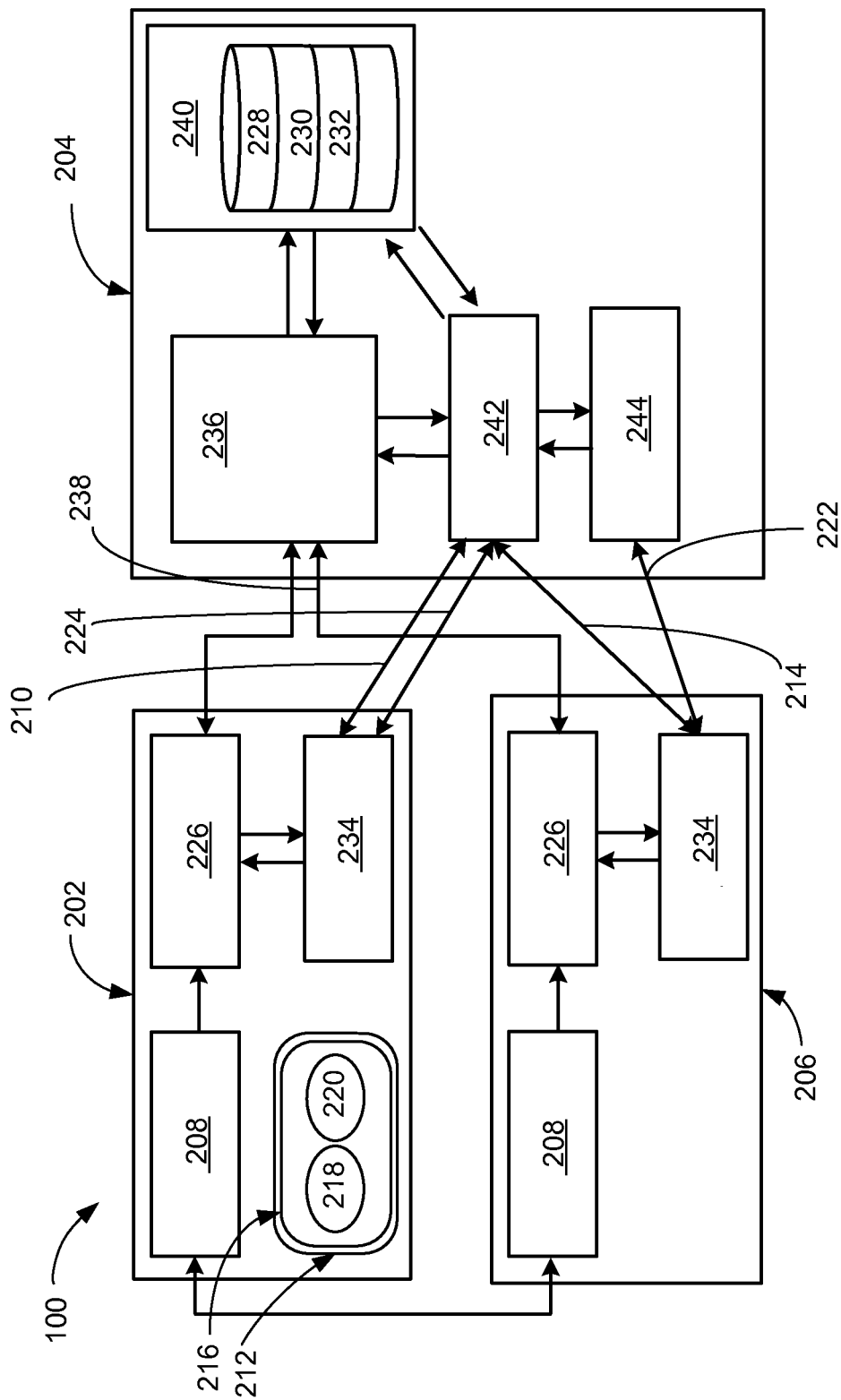
FIG. 2 is an example of a service architecture of the computing system.

Referring now to FIG. 2, therein is shown an example of a service architecture of the computing system 100. For clarity and brevity, the discussion of an embodiment of the present invention will focus on the first device 102 of FIG. 1 representing a source device 202, the second device 106 of FIG. 1 representing a data shadow server 204, and the third device 108 of FIG. 1 representing a target device 206. However, the first device 102, the second device 106, and the third device 108 can be discussed interchangeably.

The computing system 100 can include a device sensing module 208. The device sensing module 208 detects a presence of the source device 202, the target device 206, or a combination thereof for invoking a state transfer 210. The source device 202 is a device initiating the state transfer 210. The target device 206 is a recipient device of the state transfer 210. The data shadow server 204 authorizes the state transfer 210 between the source device 202 and the target device 206. The data shadow server 204 can also receive the state transfer 210 from the source device 202 and the target device 206 can receive the state transfer 210 from the data shadow server 204. The source device 202 and the target device 206 can each include an instance of the device sensing module 208.

The state transfer 210 is a transfer of an object 212 with an object state 214 from the source device 202 to the target device 206. The object can represent a variable, function, a data structure, or a combination thereof. The object 212 can include an object type 216. The object type 216 is a categorization of the object 212. The object type 216 can include an application 218, a data 220, or a combination thereof.

The object state 214 is a present operating condition of the object 212. For example, the object state 214 can include an application state 222, a data state 224, or a combination thereof. The application 218 is a computer function, which can be implemented in hardware or software. For example, the application 218 can run on the source device 202, the data shadow server 204, the target device 206, or a combination thereof. An application type 246 is a categorization of the application 218. The application state 222 is a present operating condition of the application 218. The data 220 is a value used by the application 218, the source device 202, the data shadow server 204, the target device 206, or a combination thereof. A data type 248 is a categorization of the data 220. The data state 224 is a present operating condition of the data 220.

The computing system 100 can include an identification module 226. The identification manager module 226 handles session management. For example, the identification manager module 226 can provide a user identification 228, a device identification 230, a group identification 232, or a combination thereof. The user identification 228 can represent the information regarding the identity of the user of the computing system 100. The device identification 230 can represent the information regarding the identity of the source device 202, the target device 206, or a combination thereof. The group identification 232 can represent the assemblage of a plurality of a device based on a categorization. For example, the source device 202 and the target device 206 can belong in a same group or have the same instance of the group identification 232 based on sharing the user identification 228 as a user of the source device 202 and the target device 206. The source device 202 and the target device 206 can each include an instance of the identification manager module 226.

The computing system 100 can include a service coordinator module 234. The service coordinator module 234 performs the state transfer 210. For example, the service coordinator module 234 for the source device 202 can transfer the object state 214 to the data shadow server 204. The service coordinator module 234 for the target device 206 can retrieve the object state 214 from the data shadow server 204.

The computing system 100 can include an access manager module 236. The access manager module 236 determines a device authorization 238. The device authorization 238 is permission to allow the state transfer 210. For example, the access manager module 236 can authenticate the source device 202 and the target device 206 based on the user identification 228, the device identification 230, the group identification 232, or a combination thereof. The access manager module 236 can determine the device authorization 238 based on the result of the authentication. The data shadow server 204 can include the access manager module 236.

The computing system 100 can include a database manager module 240. The database manager module 240 can support tasks related to registering, storing, and retrieving the object 212 to the database in the data shadow server 204. The data shadow server 204 can include the database manager module 240.

The computing system 100 can include a synchronization module 242. The synchronization module 242 can synchronize the object 212 between the source device 202 and the data shadow server 204. The synchronization module 242 can also synchronize the object 212 between the target device 206 and the data shadow server 204. The data shadow server 204 can include the synchronization module 242.

The computing system 100 can include a data shadow module 244. The data shadow module 244 can generate a data shadow user interface that is homogeneous across heterogeneous operating systems existing over multiple devices. For example, the data shadow module 244 can generate the data shadow user interface for the source device 202 and the target device 206. The data shadow user interface can include clipboard, collection, timeline, or a combination thereof. The data shadow server 204 can include the data shadow module 244.

Figure 3:
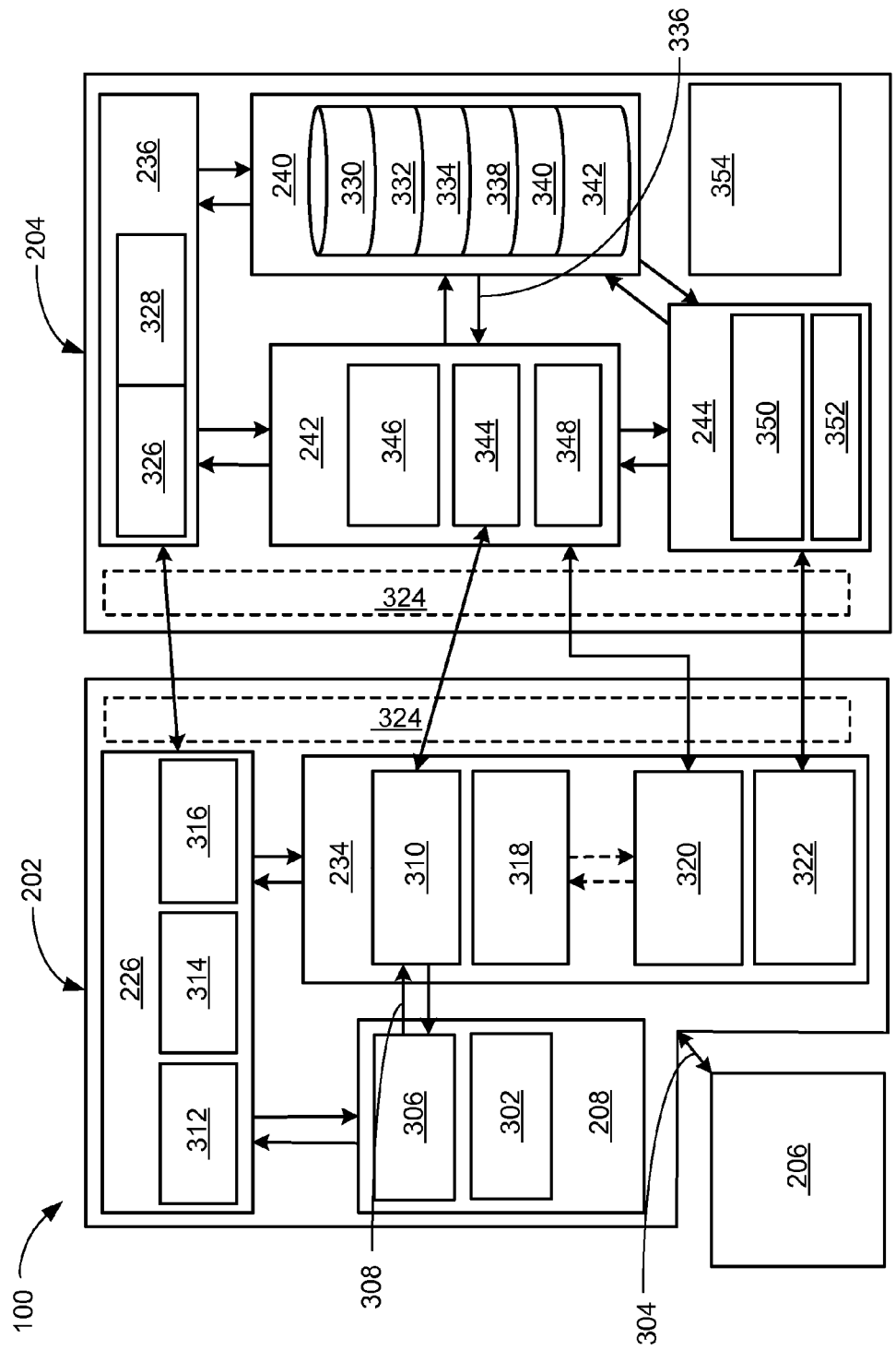
FIG. 3 is a detailed example of the service architecture described in FIG. 2.

Referring now to FIG. 3, therein is shown a detailed example of the service architecture described in FIG. 2. The device sensing module 208 can include a device discovery module 302. The device discovery module 302 enables the source device 202 to discover the target device 206. For example, the device discovery module 302 can send a communication packet 304 to detect the presence of the target device 206. The communication packet 304 is information sent between the source device 202 and the target device 206. The communication packet 304 can represent an acoustic signal such as a sound wave. The communication packet 304 can also represent an electromagnetic spectrum, such as a radio frequency, infrared, or a combination thereof. The communication packet 304 can represent an optical signal. The device discovery module 302 can discover the target device 206 by using presence technologies such as acoustic signaling, WiFi Direct/Vendor Specific Information Element (VSIE), NFC, Bluetooth, or a combination thereof.

The device sensing module 208 can include a trigger signaling module 306. The trigger signaling module 306 can generate a trigger signal 308 for sending the trigger signal 308 to a clip manager module 310 of the service coordinator module 234 for initiating the state transfer 210 of FIG. 2. Details regarding the clip manager module 310 will be discussed below.

The identification manager module 226 can include a recognition module 312. The recognition module 312 manages the login and instant recognition of the user identification 228 of FIG. 2 across the source device 202, the target device 206, or a combination thereof. For example, the user of the computing system 100 can login to the source device 202 and automatically login to the target device 206 via a cloud based automatic identification. The cloud based automatic identification can represent a seamless identification of the user identification 228 across multiple devices, such as the source device 202, the target device 206, or a combination thereof.

The identification manager module 226 can include a session module 314. The session module 314 can manage session information such as starting the session, running the session, and ending the session. The service coordinator module 234 can query the session module 314 for the session information for performing tasks, such as performing the state transfer 210, retrieving and/or synchronizing the object 212 of FIG. 2, launching the application 218 of FIG. 2, generating the data shadow user interface, or a combination thereof.

The identification manager module 226 can include a registrar module 316. The registrar module 316 can register the user identification 228, the device identification 230 of FIG. 2, the group identification 232 of FIG. 2, or a combination thereof. The registrar module 316 can provide the user identification 228, the device identification 230, the group identification 232, or a combination thereof to the device sensing module 208 for detecting the source device 202, the target device 206, or a combination thereof. The service coordinator module 234 can query the user identification 228, the device identification 230, and the group identification 232, or a combination thereof from the registrar module 316.

The service coordinator module 234 can include a clip launcher module 318. The clip launcher module 318 can launch the object 212 at the object state 214 of FIG. 2 stored in the clip manager module 310. Stated differently, the clip launcher module 318 can launch a clip of the object 212 at the object state 214. The clip can represent the application 218, the data 220 of FIG. 2, or a combination thereof stored at the given instance of the application state 222 of FIG. 2, the data state 224 of FIG. 2, or a combination thereof.

The service coordinator module 234 can include the clip manager module 310. The clip manager module 310 can store or retrieve the object state 214 based on the trigger signal 308 from the trigger signaling module 306 or a request from the clip launcher module 318. Details regarding the clip manager module 310 will be discussed below.

The service coordinator module 234 can include a data manager module 320. The data manager module 320 can synchronize the object 212 and can update the service with the synchronization module 242. Details regarding the data manager module 320 will be discussed below.

The service coordinator module 234 can include a user interface manager module 322. The user interface manager module 322 works with the data shadow module 244 to provide the data shadow user interface across multiple devices, such as the source device 202, the target device 206, or a combination thereof.

The source device 202, the target device 206, and the data shadow server 204 can include a transfer manager module 324. The transfer manager module 324 can handle the communication between the source device 202, the target device 206, the data shadow server 204, or a combination thereof. For example, the source device 202 can send the object 212 with the object state 214 for the state transfer 210 to the data shadow server 204 via the transfer manager module 324.

The access manager module 236 can include an authentication module 326. The authentication module 326 can provide the evidence for a digital identity, such as an identifier or a corresponding credential, for the user identification 228, the device identification 230, the group identification 232 or a combination thereof. The access manager module 236 can include an authorization module 328 to determine the device authorization 238 to permit the state transfer 210.

For a specific example, the identification manager module 226 of the source device 202 can query the access manager module 236 to be authenticated to initiate the state transfer 210. The target device 206 can query the access manager module 236 to be authenticated to retrieve the state transfer 210. If the source device 202 and the target device 206 share the user identification 228, the group identification 232, or a combination thereof, the authentication module 326 can authenticate that the source device 202 and the target device 206 to transact for the state transfer 210. Moreover, the authorization module 328 can determine the device authorization 238 to permit the state transfer 210.

The database manager module 240 can include a user registry module 330 for storing the user identification 228. The database manager module 240 can include a device registry module 332 for storing the device identification 230. The database manager module 240 can include a service registry module 334 for storing a service identification related to running the application 218 across multiple devices, such as the source device 202, the target device 206, or a combination thereof. The service identification can include an object activity 336 related to user's service, user's service credential, instantiation information for running the application 218, or a combination thereof. The object activity 336 can represent a log for executing, instantiating, or a combination thereof by the source device 202, the target device 206, the data shadow server 204, or a combination thereof.

The database manager module 240 can include a content registry module 338 for storing metadata for the object 212. The database manager module 240 can include a clip repository module 340 for storing the object state 214 of the object 212. The database manager module 240 can include an organizing scheme module 342 for storing the data 220 representing an information architecture for the source device 202, the target device 206, or a combination thereof.

The synchronization module 242 can include a clip server manager module 344. The clip server manager module 344 can transact with the clip manager module 310 to store metadata related to log for the clip to the clip repository module 340. The synchronization module 242 can include a content mapper module 346. The content mapper module 346 can store or retrieve the object 212 from or to the database manager module 240. The content mapper module 346 can work with a service manager 348 to provide seamless access privilege to the object 212. The synchronization module 242 can include the service manager 348. The service manager 348 can launch the application 218 interacting with the authorization module 328.

The data shadow module 244 can include a priority organization module 350. The priority organization module 350 can work with a smart information architecture engine 352 to identify the information hierarchy of the object 212 for the source device 202, the target device 206, or a combination thereof.

The data shadow server 204 can include a relation manager module 354. The relation manager module 354 can manage a task related to interaction with social network graph defined in the social service framework. The social network graph can represent a user profile based on context awareness mechanism and relationship with other users within a social network site.

Figure 4:
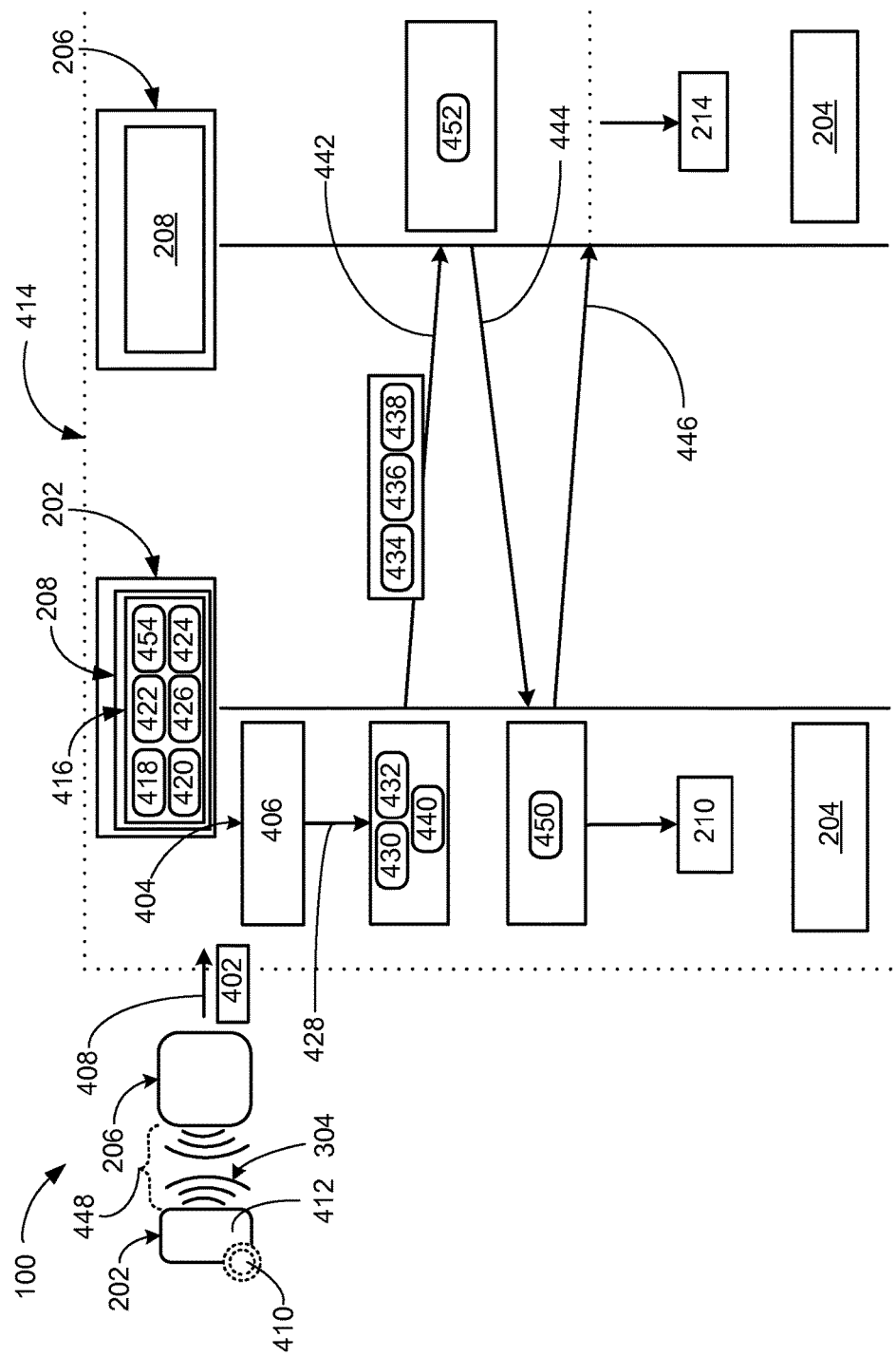
FIG. 4 is an example of a three-way handshake acoustic signaling for a presence detection.

Referring now to FIG. 4, therein is shown an example of a three-way handshake acoustic signaling for a presence detection. The three-way handshake acoustic signaling can occur between the device sensing module 208 of the source device 202 and the device sensing module 208 of the target device 206. More specifically, the source device 202 can detect the presence of the target device 206 after detecting a transfer intent 402 and a device state 404 of the source device 202 reaches an inertial stability 406.

The transfer intent 402 is a desire to conduct the state transfer 210. For example, the user of the computing system 100 can disclose the transfer intent 402 based on a user's behavior 408. The user's behavior 408 can be disclosed by a gesture type 410. The gesture type 410 is an action performed on the source device 202, the target device 206, or a combination thereof. For example, the gesture type 410 can include a press gesture, a select gesture, a shake gesture, a pointing gesture, or a combination thereof. For a specific example, the user of the computing system 100 can perform the gesture type 410 of the press gesture on a display interface 412 of the source device 202. Details regarding the gesture type 410 will be discussed below.

The device state 404 is a present operating condition of the source device 202, the target device 206, or a combination thereof. For example, the device state 404 can represent the source device 202 running the application 218 of FIG. 2. The inertial stability 406 is a present condition of the source device 202 or the target device 206 where no physical movement towards three-dimensional Cartesian coordinate is detected.

A transfer context 414 is a situation, circumstance, or a combination thereof surrounding the source device 202, the target device 206, or a combination thereof. The transfer context 414 can be determined based on a transfer condition 416. The transfer condition 416 can include a transfer location 418, an urgency level 420, a sensitivity level 422, a transfer proximity 424, a reliability level 426, a security level 454, or a combination thereof.

The transfer location 418 is a physical location where the presence detection between the source device 202 and the target device 206 is conducted. The urgency level 420 is a level of imperativeness, imminence, or a combination thereof. The sensitivity level 422 is a level of averseness towards disclosure. The reliability level 426 is a level of assuredness for completing the state transfer 210. The security level 454 is a level of protection placed on the object 212 of FIG. 2.

The transfer proximity 424 is a minimum level of nearness between the source device 202 and the target device 206 to invoke the state transfer 210. For example, the transfer proximity 424 can represent a physical distance between the source device 202 and the target device 206. A transfer type 428 is a categorization of the state transfer 210. For example, the transfer type 428 can include the state transfer 210 involving one instance of the source device 202 to a plurality of the target device 206 or to one instance of the target device 206. The source device 202 can transfer the object state 214 to the data shadow server 204. The target device 206 can retrieve the object state 214 from the data shadow server 204.

A packet type 430 is a categorization of the communication packet 304. A transfer modulation 432 is an arrangement of a modulation scheme 434 of the communication packet 304. The modulation scheme 434 is a property of the communication packet 304. For example, the modulation scheme 434 can include a modulation frequency 436, a modulation amplitude 438, or a combination thereof. The modulation frequency 436 is a number of cycles per unit time of the communication packet 304. For example, the modulation frequency 436 can represent a radio frequency with a rate of oscillation in the range of about 3 kilohertz (KHz) to 300 gigahertz (GHz). The modulation amplitude 438 is a height and depth of a wave of the communication packet 304.

The source device 202 and the target device 206 can send a variety of a notification type 440 between one another to determine the presence of each other. The notification type 440 can include an initiation notification 442, a reply notification 444, and a confirmation notification 446. The initiation notification 442 is the communication packet 304 sent by the source device 202 to initiate a detection of the target device 206. The reply notification 444 is the communication packet 304 sent by the target device 206 in response to receiving the initiation notification 442. The confirmation notification 446 is the communication packet 304 sent by the source device 202 in response to receiving the reply notification 444.

A communication proximity 448 is a level of nearness between the source device 202 and the target device 206 calculated based on exchanging the notification type 440. A transmission time 450 is amount of time taken to send the communication packet 304 from one device to another. For example, the transmission time 450 can represent the amount of time for the source device 202 to send the initiation notification 442 to the target device 206. A transmission speed 452 is a magnitude of velocity of the communication packet 304 transmitted from one device to another. For example, the transmission speed 452 can represent the magnitude of velocity for sending the reply notification 444 from the target device 206 to the source device 202.

Figure 5:
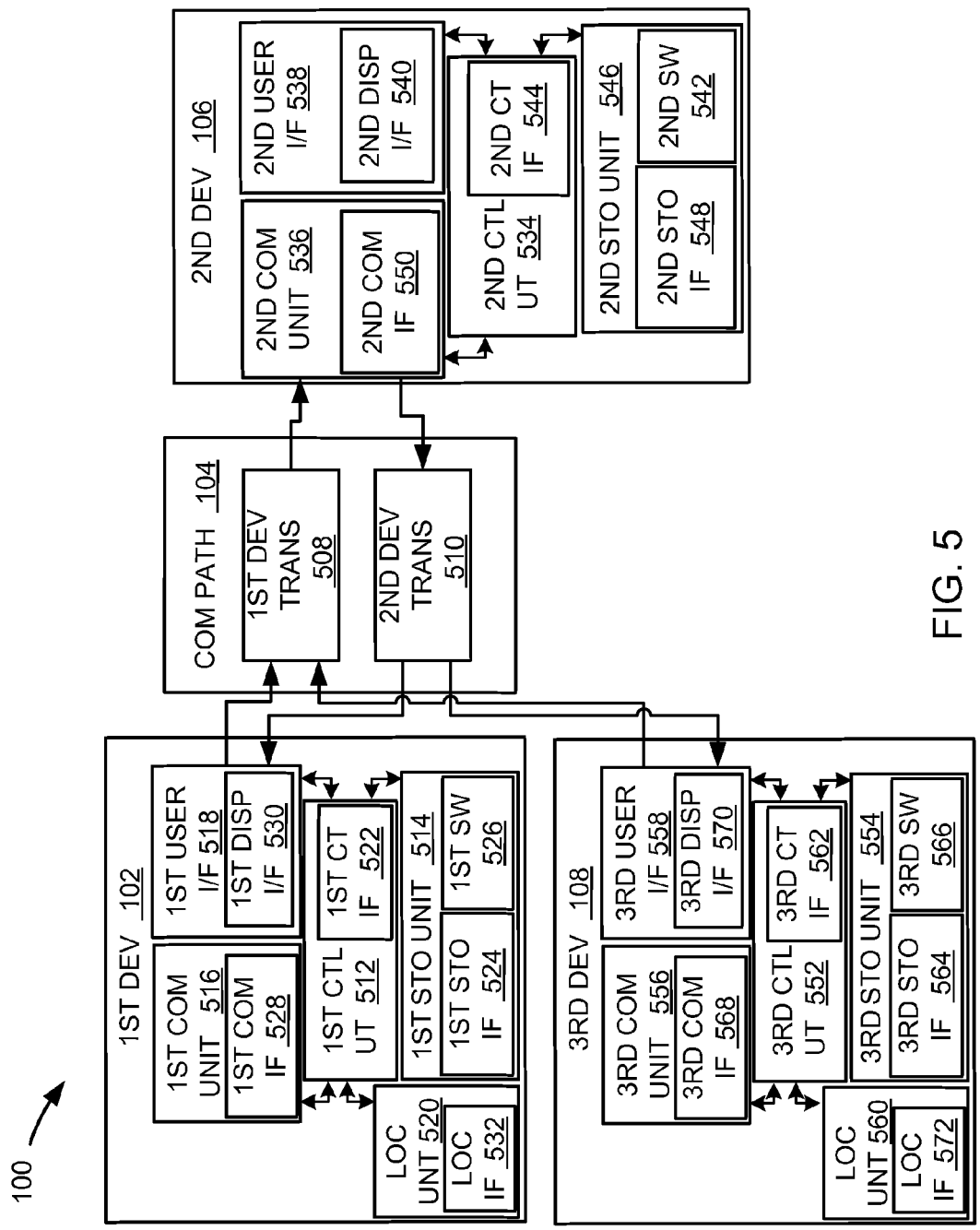
FIG. 5 is an exemplary block diagram of the computing system.

Referring now to FIG. 5, therein is shown an exemplary block diagram of the computing system 100. The computing system 100 can include the first device 102, the third device 108, the communication path 104, and the second device 106. The first device 102 or the third device 108 can send information in a first device transmission 508 over the communication path 104 to the second device 106. The second device 106 can send information in a second device transmission 510 over the communication path 104 to the first device 102 or the third device 108.

For illustrative purposes, the computing system 100 is shown with the first device 102 or the third device 108 as a client device, although it is understood that the computing system 100 can have the first device 102 or the third device 108 as a different type of device. For example, the first device 102 or the third device 108 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 or the third device 108 will be described as a client device and the second device 106 will be described as a server device. The embodiment of the present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the computing system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or external destinations. The external sources and the external destinations refer to sources and destinations physically separate from to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof. The relevant information can also include news, media, events, or a combination thereof from the third party content provider.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the first device 102 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the computing system 100. The first control unit 512 can also execute the first software 526 for the other functions of the computing system 100, including receiving location information from the location unit 520. The first control unit 512 can further execute the first software 526 for interaction with the communication path 104 via the first communication unit 516.

The second device 106 can be optimized for implementing the embodiment of the present invention in a multiple device embodiment with the second device 106. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the computing system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the computing system 100, including operating the second communication unit 536 to communicate with the second device 106 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the computing system 100 is shown with the second storage unit 546 as a single hierarchy storage system, although it is understood that the computing system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The computing system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The third device 108 can include a third control unit 552, a third storage unit 554, a third communication unit 556, a third user interface 558, and a location unit 560. The third control unit 552 can include a third control interface 562. The third control unit 552 can execute a third software 566 to provide the intelligence of the computing system 100. The third control unit 552 can be implemented in a number of different manners. For example, the third control unit 552 can be a processor, an embedded processor, a microprocessor, a hardware control logic, a hardware finite state machine (FSM), a digital signal processor (DSP), or a combination thereof. The third control interface 562 can be used for communication between the third control unit 552 and other functional units in the third device 108. The third control interface 562 can also be used for communication that is external to the third device 108.

The third control interface 562 can receive information from the other functional units or from external sources, or can transmit information to the other functional units or to external destinations. The external sources and the external destinations refer to sources and destinations physically separate to the third device 108.

The third control interface 562 can be implemented in different ways and can include different implementations depending on which functional units or external units are being interfaced with the third control interface 562. For example, the third control interface 562 can be implemented with a pressure sensor, an inertial sensor, a microelectromechanical system (MEMS), optical circuitry, waveguides, wireless circuitry, wireline circuitry, or a combination thereof.

The location unit 560 can generate location information, current heading, and current speed of the third device 108, as examples. The location unit 560 can be implemented in many ways. For example, the location unit 560 can function as at least a part of a global positioning system (GPS), an inertial navigation system, a cellular-tower location system, a pressure location system, or any combination thereof.

The location unit 560 can include a location interface 572. The location interface 572 can be used for communication between the location unit 560 and other functional units in the third device 108. The location interface 572 can also be used for communication that is external to the third device 108.

The location interface 572 can receive information from the other functional units or from external sources, or can transmit information to the other functional units or to external destinations. The external sources and the external destinations refer to sources and destinations physically separate to the third device 108.

The location interface 572 can include different implementations depending on which functional units or external units are being interfaced with the location unit 560. The location interface 572 can be implemented with technologies and techniques similar to the implementation of the third control interface 562.

The third storage unit 554 can store the third software 566. The third storage unit 554 can also store the relevant information, such as advertisements, points of interest (POI), navigation routing entries, or any combination thereof.

The third storage unit 554 can be a volatile memory, a nonvolatile memory, an internal memory, an external memory, or a combination thereof. For example, the third storage unit 554 can be a nonvolatile storage such as non-volatile random access memory (NVRAM), Flash memory, disk storage, or a volatile storage such as static random access memory (SRAM).

The third storage unit 554 can include a third storage interface 564. The third storage interface 564 can be used for communication between the location unit 560 and other functional units in the third device 108. The third storage interface 564 can also be used for communication that is external to the third device 108.

The third storage interface 564 can receive information from the other functional units or from external sources, or can transmit information to the other functional units or to external destinations. The external sources and the external destinations refer to sources and destinations physically separate to the third device 108.

The third storage interface 564 can include different implementations depending on which functional units or external units are being interfaced with the third storage unit 554. The third storage interface 564 can be implemented with technologies and techniques similar to the implementation of the third control interface 562.

The third communication unit 556 can enable external communication to and from the third device 108. For example, the third communication unit 556 can permit the third device 108 to communicate with the second device 106 of FIG. 1, an attachment, such as a peripheral device or a computer desktop, and the communication path 104.

The third communication unit 556 can also function as a communication hub allowing the third device 108 to function as part of the communication path 104 and not limited to be an end point or terminal unit to the communication path 104. The third communication unit 556 can include active and passive components, such as microelectronics or an antenna, for interaction with the communication path 104.

The third communication unit 556 can include a third communication interface 568. The third communication interface 568 can be used for communication between the third communication unit 556 and other functional units in the third device 108. The third communication interface 568 can receive information from the other functional units or can transmit information to the other functional units.

The third communication interface 568 can include different implementations depending on which functional units are being interfaced with the third communication unit 556. The third communication interface 568 can be implemented with technologies and techniques similar to the implementation of the third control interface 562.

The third user interface 558 allows a user (not shown) to interface and interact with the third device 108. The third user interface 558 can include an input device and an output device. Examples of the input device of the third user interface 558 can include a keypad, a touchpad, soft-keys, a keyboard, a microphone, or any combination thereof to provide data and communication inputs.

The third user interface 558 can include a third display interface 570. The third display interface 570 can include a display, a projector, a video screen, a speaker, or any combination thereof.

The third control unit 552 can operate the third user interface 558 to display information generated by the computing system 100. The third control unit 552 can also execute the third software 566 for the other functions of the computing system 100, including receiving location information from the location unit 560. The third control unit 552 can further execute the third software 566 for interaction with the communication path 104 via the third communication unit 556.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the computing system 100 is described by operation of the first device 102, the second device 106, and the third device 108. It is understood that the first device 102, the second device 106, the third device 108 can operate any of the modules and functions of the computing system 100. For example, the first device 102 is described to operate the location unit 520, although it is understood that the second device 106 or the third device 108 can also operate the location unit 520.

Figure 6:
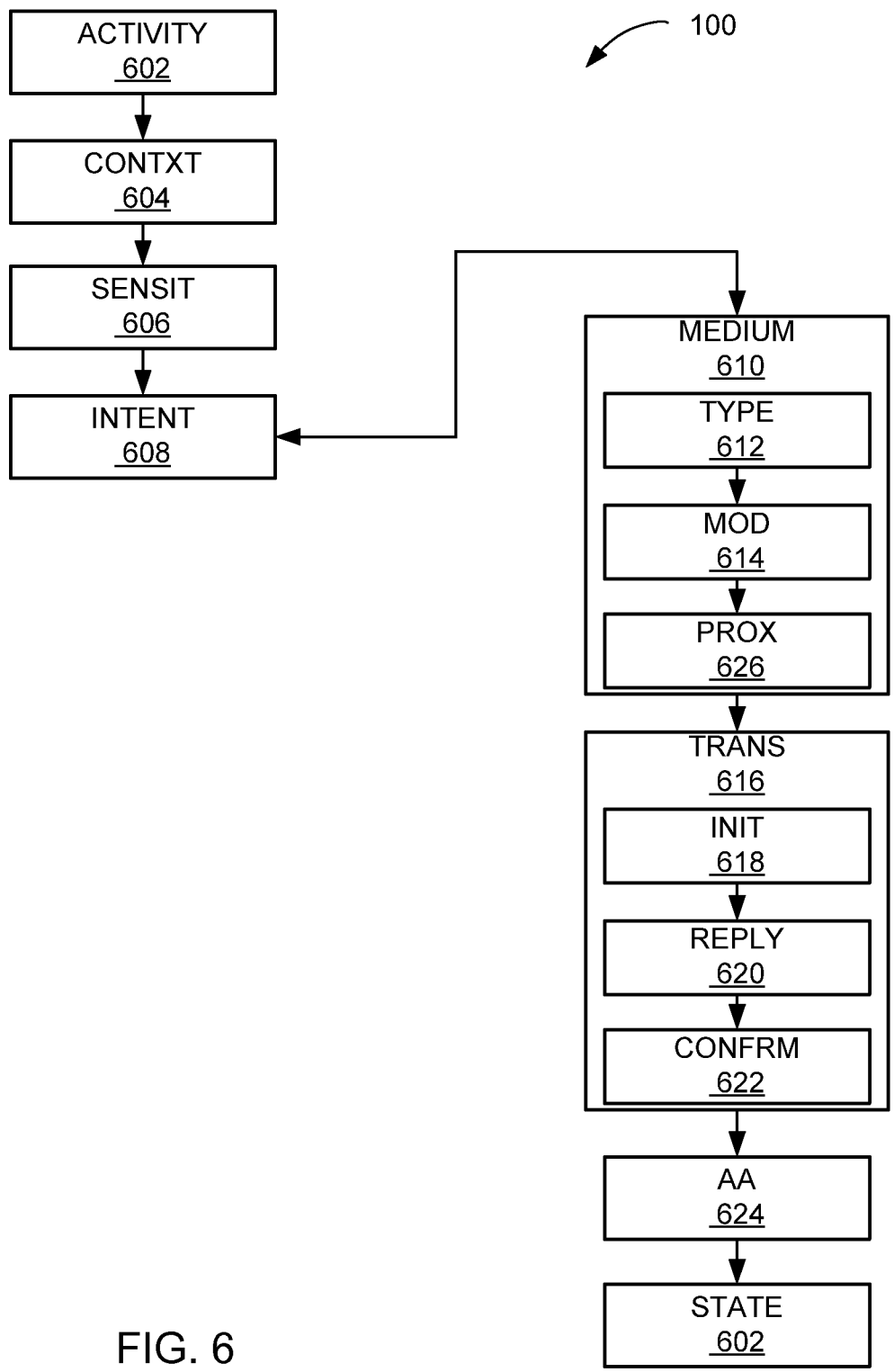
FIG. 6 is a control flow of the computing system.

Referring now to FIG. 6, therein is shown a control flow of the computing system 100. The computing system 100 can include an activity module 602. The activity module 602 determines the object activity 336 of FIG. 3. For example, the activity module 602 can determine the object activity 336 of the object 212 of FIG. 2 invoked within the source device 202 of FIG. 2. For brevity and clarity, the first device 102 of FIG. 1 can represent the source device 202 and the third device 108 of FIG. 1 can represent the target device 206 of FIG. 2.

The activity module 602 can determine the object activity 336 in a number of ways. For example, the activity module 602 can determine the object activity 336 for the object 212 representing the application 218 of FIG. 2 running on the source device 202. More specifically, the activity module 602 can determine the object activity 336 of the application 218 based on determining the program counter for identifying the process being invoked for the application 218. If the application 218 is running, the activity module 602 can determine the specific value of the program counter to identify what process is being invoked by the application 218 of the source device 202.

For a different example, the activity module 602 can determine the object activity 336 for the object 212 representing the data 220 of FIG. 2 being passed by the application 218. More specifically, as discussed, the activity module 602 can track the object activity 336 for identifying the process of the application 218 being invoked. Similarly, the activity module 602 can track the object activity 336 of the data 220 based on identifying the value of the data 220 before the process is invoked and the value of the data 220 after the process has been invoked. The activity module 602 can send the object activity 336 to a context module 604.

The computing system 100 can include the context module 604, which can couple to the activity module 602. The context module 604 determines the transfer context 414 of FIG. 4. For example, the context module 604 can determine the transfer context 414 based on the transfer condition 416 of FIG. 4.

The context module 604 can determine the transfer context 414 in a number of ways. For example, the context module 604 can determine the transfer context 414 based on the transfer condition 416 representing the transfer location 418 of FIG. 4, the object type 216 of FIG. 2, or a combination thereof. More specifically, the transfer location 418 can represent a hospital. The source device 202 can represent a tablet carried by the doctor. The object type 216 that the doctor seeks to transfer can represent the data 220 representing medical information processed by the application 218 within the source device 202. Based on the transfer location 418, the object type 216, or a combination thereof, the context module 604 can determine the transfer context 414 to have the urgency level 420 of FIG. 4 of high.

In contrast, the transfer location 418 can represent the user's room at home. The object type 216 to be transferred can represent the application 218 for drafting an email. Based on the transfer location 418, the object type 216, or a combination thereof, the context module 604 can determine the transfer context 414 to have the urgency level 420 of low. The context module 604 can send the transfer context 414 to a sensitivity module 606.

The computing system 100 can include the sensitivity module 606, which can couple to the context module 604. The sensitivity module 606 determines the sensitivity level 422 of FIG. 4. For example, the sensitivity module 606 can determine the sensitivity level 422 based on the object type 216 of the object 212.

The sensitivity module 606 can determine the sensitivity level 422 in a number of ways. For example, the sensitivity module 606 can determine the sensitivity level 422 based on the object type 216 representing the application type 246 of FIG. 2, the data type 248 of FIG. 2, or a combination thereof. More specifically, the application type 246 can represent the application 218 for playing a video game on the source device 202. The sensitivity module 606 can determine the sensitivity level 422 for the application type 246 to be low based on the application type 246 being a category of a game. In contrast, the application type 246 can represent web-based personal financial service. The sensitivity module 606 can determine the sensitivity level 422 for the application type 246 to be high based on high confidentiality of the user's finance information.

For a different example, the sensitivity module 606 can determine the sensitivity level 422 based on the security level 454 of FIG. 4 of the object 212. More specifically, the object 212 can represent the application 218 for writing an email. The email can include the data type 248 of music file without any password on the data 220. Thus, the security level 454 can represent low. The sensitivity module 606 can determine the sensitivity level 422 of low based on the security level 454 of low.

In contrast, the email can include the data type 248 representing tax information with password protection. Thus, the security level 454 can represent high. The sensitivity module 606 can determine the sensitivity level 422 of high based on the security level 454 of high.

For a different example, the sensitivity module 606 can determine the sensitivity level 422 based on the transfer context 414. As discussed above, the transfer context 414 can have the urgency level 420 of high when the doctor seeks to transfer the object type 216 of medical information. The sensitivity module 606 can determine the sensitivity level 422 of the medical information to be high based on the urgency level 420 of high. In contrast, the transfer context 414 can have the urgency level 420 of low when the user is planning to transfer the object type 216 of personal email to a friend. The sensitivity module 606 can determine the sensitivity level 422 of personal email to be low based on the urgency level 420 of low. The sensitivity module 606 can send the sensitivity level 422 to an intent module 608.

The computing system 100 can include the intent module 608, which can couple to the sensitivity module 606. The intent module 608 detects the transfer intent 402 of FIG. 4. For example, the intent module 608 can detect the transfer intent 402 based on the user's behavior 408 of FIG. 4, the transfer proximity 424 of FIG. 4, the device state 404 of FIG. 4, or a combination thereof.

The intent module 608 can detect the transfer intent 402 in a number of ways. For example, the intent module 608 can detect the transfer intent 402 for the object type 216 based on the user's behavior 408 represented by the gesture type 410 of FIG. 4. More specifically, the gesture type 410 can be predefined for invoking the source device 202 to initiate the state transfer 210 of FIG. 2.

For example, the gesture type 410 can represent pressing the application 218 displayed on the display interface 412 of FIG. 4 for more than two seconds. For another example, the gesture type 410 can represent shaking the source device 202 for invoking the state transfer 210 for the object type 216 of the application 218 in use currently. For a different example, the gesture type 410 can represent selecting the menu to invoke the state transfer 210 for the object type 216 of the data 220.

For further example, the intent module 608 can determine the transfer intent 402 for the transfer type 428 of FIG. 4 based on the gesture type 410. More specifically, the gesture type 410 of pointing with the source device 202 at the target device 206 can be preset to invoke the state transfer 210 for the transfer type 428 of one-to-one transfer between the source device 202 and the target device 206. In contrast, the gesture type 410 representing a motion for drawing a circle with the source device 202 can be preset to invoke the state transfer 210 for the transfer type 428 of one-to-many transfer between the source device 202 and a plurality of the target device 206. Based on the gesture type 410 of the user's behavior 408, the intent module 608 can determine the transfer intent 402 of the object type 216 that the user of the computing system 100 intends to perform as the state transfer 210 with a specific instance of the transfer type 428.

For a different example, the intent module 608 can determine the transfer intent 402 based on locating the source device 202 within the transfer proximity 424. The transfer proximity 424 can be predefined to trigger the state transfer 210 of the object 212 from the source device 202 to the target device 206. For example, the transfer proximity 424 can be set as a physical distance between the source device 202 and the target device 206. More specifically, the transfer proximity 424 can represent 30 centimeters. The intent module 608 can determine the transfer intent 402 to invoke the state transfer 210 when the transfer proximity 424 between the source device 202 and the target device 206 is within 30 centimeters. The intent module 608 can determine that the source device 202 and the target device 206 are within the transfer proximity 424 based on detecting the physical location of the source device 202 via the location unit 520 of FIG. 5 and the location unit 560 of FIG. 5 of the target device 206.

For another example, the intent module 608 can determine the transfer intent 402 based on the device state 404 of the source device 202, the target device 206, or a combination thereof. More specifically, the intent module 608 can determine the transfer intent 402 when the device state 404 reaches the inertial stability 406 of FIG. 4. For example, the source device 202 can be placed on a flat surface, such as a table. The device state 404 of the source device 202 can reach the inertial stability 406 based on the location unit 520 detecting no movement by the source device 202. The device state 404 of the target device 206 can reach the inertial stability 406 based on the location unit 560 detecting no movement by the target device 206. The source device 202 and the target device 206 can be within the transfer proximity 424 of 30 centimeters. Based on the inertial stability 406 and the two devices within the transfer proximity 424, the intent module 608 can determine the transfer intent 402 to invoke the state transfer 210 between the source device 202 and the target device 206. The intent module 608 can send the transfer intent 402 to a packet module 610.

For illustrative purposes, the computing system 100 is described with the context module 604 determining the transfer context 414 based on the transfer condition 416, although it is understood that the context module 604 can operate differently. For example, the context module 604 can determine the reliability level 426 of FIG. 4 of the transfer context 414 based on the transfer type 428, the transfer proximity 424, or a combination thereof.

The context module 604 can determine the reliability level 426 of the transfer context 414 in a number of ways. For example, the transfer proximity 424 can represent a short physical distance of under 1 meter. The transfer type 428 can represent one-to-one transfer between the source device 202 and the target device 206. The context module 604 can determine the reliability level 426 of high for the transfer context 414 between the source device 202 and the target device 206 based on the short physical distance and the one-to-one transfer of the state transfer 210.

For a different example, the transfer proximity 424 can represent within the physical distance greater than 1 meter. More specifically, the transfer proximity 424 can represent that the source device 202 is within the same building as the target device 206. Furthermore, the transfer type 428 can represent one-to-many for the state transfer 210 between one instance of the source device 202 and the plurality of the target device 206. Based on the transfer proximity 424 and the transfer type 428, the context module 604 can determine the reliability level 426 of the transfer context 414 to be low. The context module 604 can send the transfer context 414 to the packet module 610.

The computing system 100 can include the packet module 610, which can couple to the intent module 608. The packet module 610 determines the packet type 430 of FIG. 4. For example, the packet module 610 can determine the packet type 430 with the transfer modulation 432 of FIG. 4 for sending the communication packet 304 of FIG. 3 to detect the source device 202, target device 206, or a combination thereof. For another example, the packet module 610 can determine the packet type 430 with the transfer modulation 432 for detecting the source device 202, the target device 206, or a combination thereof to invoke the state transfer 210.

The packet module 610 can include a type module 612. The type module 612 determines the packet type 430. For example, the type module 612 can determine the packet type 430 for sending the communication packet 304 based on the transfer context 414, the transfer intent 402, the transfer proximity 424, the sensitivity level 422, or a combination thereof.

The type module 612 can determine the packet type 430 in a number of ways. For example, the type module 612 can determine the packet type 430 based on the transfer context 414 for detecting the source device 202 and the target device 206. More specifically, the transfer context 414 can represent a quiet surrounding with a sound pressure level below 50 decibels. The type module 612 can determine the packet type 430 for the communication packet 304 to represent a sound wave based on the transfer context 414 representing a quiet surrounding.

In contrast, the type module 612 can determine the packet type 430 for the communication packet 304 to represent an infrared based on the transfer context 414 representing a noisy surrounding. The noisy surrounding can represent the transfer condition 416 where the sound pressure level is above 90 decibels. Unlike the sound wave where the sound wave of the sound wave can be muffled in the noisy room, the infrared can be detected by the target device 206 even in the noisy room.

It has been discovered that the computing system 100 can determine the packet type 430 based on the transfer context 414 to improve the detection of the source device 202, the target device 206, or a combination thereof for invoking the state transfer 210. By factoring the transfer context 414, the computing system 100 can select the packet type 430 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

For a different example, the type module 612 can determine the packet type 430 based on the transfer proximity 424 between the source device 202 and the target device 206. For example, the transfer proximity 424 can represent less than 1 meter in physical distance. Based on the short range of the transfer proximity 424, the type module 612 can determine the packet type 430 of the communication packet 304 to represent a sound wave, an infrared, a light wave, or a combination thereof. In contrast, the transfer proximity 424 can represent greater than 50 meter. The type module 612 can determine the packet type 430 of the communication packet 304 to represent a radio frequency, vibration, or a combination thereof based on the long range of the transfer proximity 424. The type module 612 can send the packet type 430 to a modulation module 614.

It has been discovered that the computing system 100 can determine the packet type 430 based on the transfer proximity 424 to improve the detection of the source device 202, the target device 206, or a combination thereof for invoking the state transfer 210. By factoring the transfer proximity 424, the computing system 100 can select the packet type 430 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

The packet module 610 can include the modulation module 614, which can couple to the type module 612. The modulation module 614 generates the transfer modulation 432. For example, the modulation module 614 can generate the transfer modulation 432 based on the packet type 430 for sending the communication packet 304 from the source device 202 to the target device 206 or vice versa.

The modulation module 614 can generate the transfer modulation 432 in a number of ways. For example, the modulation module 614 can generate the transfer modulation 432 based on the modulation scheme 434 of FIG. 4. More specifically, the modulation scheme 434 can include the modulation frequency 436 of FIG. 4, the modulation amplitude 438 of FIG. 4, or a combination thereof. Furthermore, the modulation module 614 can generate the transfer modulation 432 having a various combination of the modulation frequency 436 and the modulation amplitude 438 for sending the communication packet 304 between the source device 202 and the target device 206.

For a specific example, the modulation module 614 can generate the transfer modulation 432 based on the transfer context 414, the transfer intent 402, or a combination thereof. More specifically, the modulation module 614 can generate the transfer modulation 432 having the modulation amplitude 438 for the transfer context 414 of a noisy setting greater than the modulation amplitude 438 for the transfer context 414 of a quiet setting. Further, the modulation module 614 can generate the transfer modulation 432 having the modulation frequency 436 for the transfer context 414 of a noisy setting less than the modulation frequency 436 for the transfer context 414 of a quiet setting.

For a different example, the modulation module 614 can generate the transfer modulation 432 based on the packet type 430, the transfer context 414, or a combination thereof for adjusting to the modulation scheme 434 suited for the transfer context 414. For a specific example, the packet type 430 of sound wave with the modulation frequency 436 of less than 5 kilohertz (KHz) can be more susceptible to noise and less detectable by the target device 206. The modulation module 614 can generate the transfer modulation 432 with the modulation frequency 436 of greater than 5 KHz in a noisy surrounding. In contrast, the modulation module 614 can generate the transfer modulation 432 with the modulation frequency 436 of less than 5 KHz in a quiet surrounding.

It has been discovered that the computing system 100 can generate the transfer modulation 432 based on the transfer context 414 to improve the detection of the source device 202, the target device 206, or a combination thereof for invoking the state transfer 210. By factoring the transfer context 414, the computing system 100 can select the transfer modulation 432 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

For a different example, the modulation module 614 can generate the transfer modulation 432 based on the urgency level 420, the reliability level 426, the sensitivity level 422, or a combination thereof for adjusting the modulation scheme 434. More specifically, the modulation module 614 can increase the modulation amplitude 438, can decrease the modulation frequency 436, or a combination thereof if the reliability level 426 of the transfer context 414 is determined to be low. With lower instance of the modulation frequency 436, the communication packet 304 can be less susceptible to noise, thus, more reliable. Further, in the transfer context 414 of a noisy setting, the higher instance of the modulation amplitude 438 can overcome the noise, thus, more reliable.

In contrast, the modulation module 614 can decrease the modulation amplitude 438, can increase the modulation frequency 436, or a combination thereof if the urgency level 420 of the transfer context 414 is determined to be high, the sensitivity level 422 of the object 212 is determined to be high, or a combination thereof. More specifically, the modulation module 614 can generate the transfer modulation 432 with the higher instance of the modulation frequency 436 when the urgency level 420, the sensitivity level 422, or a combination thereof is high than low to improve security. Furthermore, the modulation module 614 can generate the transfer modulation 432 with lower instance of the modulation amplitude 438 when the urgency level 420, the sensitivity level 422, or a combination thereof is high than low to make the communication packet 304 less susceptible to eavesdropping.

It has been discovered that the computing system 100 can generate the transfer modulation 432 based on the urgency level 420, the reliability level 426, the sensitivity level 422, or a combination thereof to improve the detection of the source device 202, the target device 206, or a combination thereof for invoking the state transfer 210. By factoring the urgency level 420, the reliability level 426, the sensitivity level 422, or a combination thereof, the computing system 100 can select the transfer modulation 432 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

For a different example, the modulation module 614 can generate the transfer modulation 432 based on the transfer intent 402 by placing the source device 202 within the transfer proximity 424 from the target device 206. More specifically, the modulation scheme 434 can differ based on the transfer proximity 424. For example, an instance of the transfer proximity 424 can represent 1 meter. Another instance of the transfer proximity 424 can represent 100 meters. The modulation module 614 can generate the transfer modulation 432 having the modulation amplitude 438 with a greater value when the transfer proximity 424 is 100 meters than 1 meter can generate the transfer modulation 432 having the modulation amplitude 438 with a greater value when the transfer proximity 424 is 100 meters than 1 meter for improving detectability by the target device 206. In contrast, the modulation module 614 can generate the transfer modulation 432 having the modulation frequency 436 with a lesser value when the transfer proximity 424 is 100 meters than 1 meter for improving detectability of the communication packet 304 by the source device 202, the target device 206, or a combination thereof.

It has been discovered that the computing system 100 can generate the transfer modulation 432 based on the transfer proximity 424 to improve the detection of the source device 202, the target device 206, or a combination thereof for invoking the state transfer 210. By factoring the transfer proximity 424, the computing system 100 can select the transfer modulation 432 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

For a different example, the modulation module 614 can generate the transfer modulation 432 based on the initiation notification 442 of FIG. 4, the reply notification 444 of FIG. 4, the confirmation notification 446 of FIG. 4, or a combination thereof. More specifically, each instances of the notification type 440 of FIG. 4 can have the transfer modulation 432 that is different from one another.

For example, the initiation notification 442 can have the transfer modulation 432 with three consecutive tones with the following instances of the modulation frequency 436: 17 KHz; 18 KHz; and 19 KHz. More specifically, the transfer modulation 432 can represent the modulation frequency 436 in an ascending order. The reply notification 444 can have the transfer modulation 432 with three consecutive tones with the following instances of the modulation frequency 436 in reverse order as the initiation notification 442: 19 KHz; 18 KHz; and 17 KHz. More specifically, the transfer modulation 432 can represent the modulation frequency 436 in a descending order.

The confirmation notification 446 can have the transfer modulation 432 with three consecutive tones with the following instances of the modulation frequency 436: 20 KHz; 20 KHz; and 20 KHz. More specifically, the transfer modulation 432 can represent the modulation frequency 436 having same value for the tones. Each of the notification type 440 can have the transfer modulation 432 with the modulation scheme 434 with ascending order, descending order, equal value, or a combination thereof. More specifically, each of the notification type 440 can have the modulation amplitude 438 in ascending order, descending order, equal value, or a combination thereof. The packet module 610 can send the packet type 430 with the transfer modulation 432 to a transmission module 616.

It has been discovered that the computing system 100 can generate the transfer modulation 432 based on the notification type 440 to improve the detection of the source device 202, the target device 206, or a combination thereof for invoking the state transfer 210. By tailoring the transfer modulation 432 according to the notification type 440, the computing system 100 can select the transfer modulation 432 best suited to be detected by the source device 202, the target device 206, or a combination. As a result, the computing system 100 can improve the efficiency for invoking the state transfer 210 for enhancing the user experience for using the computing system 100, the source device 202, the target device 206, or a combination thereof.

The computing system 100 can include the transmission module 616, which can couple to the packet module 610. The transmission module 616 sends the communication packet 304 for the notification type 440. For example, the transmission module 616 can send the communication packet for the notification type 440 according to the transfer modulation 432.

The transmission module 616 can include an initiation module 618. The initiation module 618 sends the initiation notification 442. For example, the initiation module 618 can send the initiation notification 442 based on the object activity 336, the transfer intent 402, the device state 404, or a combination thereof.

The initiation module 618 can send the initiation notification 442 in a number of ways. For example, the initiation module 618 can send the initiation notification 442 based on the object activity 336 of having the application 218 running and displayed on the forefront of the display interface 412. For another example, the initiation module 618 can send the initiation notification 442 based on the determining the transfer intent 402 to invoke the state transfer 210. More specifically, the transfer intent 402 can be determined based on the source device 202 placed within the transfer proximity 424 to the target device 206. The initiation module 618 can send the initiation notification 442 once the source device 202 and the target device 206 are within the transfer proximity 424.

For another example, the initiation module 618 can send the initiation notification 442 based on the device state 404 of the source device 202. More specifically, once the device state 404 reaches the inertial stability 406, the initiation module 618 can determine that the initiation notification 442 can be sent. The initiation module 618 can reside on the source device 202. The initiation module 618 can send the initiation notification 442 based on the packet type 430 according to the transfer modulation 432 to a reply module 620. The reply module 620 residing in the target device 206.

The transmission module 616 can include the reply module 620, which can couple to the initiation module 618. The reply module 620 sends the reply notification 444. For example, the reply module 620 can send the reply notification 444 based on receiving the initiation notification 442, the device state 404 of the target device 206, or a combination thereof. More specifically, the reply module 620 can send the reply notification 444 based on the device state 404 of the target device 206 reaching the inertial stability 406. The reply module 620 can send the reply notification to a confirmation module 622.

The transmission module 616 can include the confirmation module 622, which can couple to the reply module 620. The confirmation module 622 sends the confirmation notification 446. For example, the confirmation module 622 can send the confirmation notification 446 based on the initiation notification 442 sent and the reply notification 444 received by the source device 202. More specifically, the confirmation module 622 can send the confirmation notification 446 to the target device 206. The transmission module 616 can send the confirmation notification 446 to an access authorization module 624. The device sensing module 208 of FIG. 2 can include the packet module 610 and the transmission module 616.

For illustrative purposes, the computing system 100 is described with the transmission module 616 sending the communication packet 304 of the notification type 440, although it is understood that the transmission module 616 can operate differently. For example, the transmission module 616 can include a proximity module 626 for determining the communication proximity 448 of FIG. 4.

The proximity module 626 determines the communication proximity 448. For example, the proximity module 626 can determine the communication proximity 448 based on the packet type 430, the transmission time 450 of FIG. 4, or a combination thereof. More specifically, the proximity module 626 can calculate the transmission time 450 for sending the communication packet 304 of the packet type 430. For a specific example, the packet type 430 can represent a sound wave. The source device 202 can send the initiation notification 442 to the target device 206. The proximity module 626 can calculate the transmission time 450 between the initiation notification 442 sent to the initiation notification 442 received. The proximity module 626 can also calculate the transmission time 450 for the reply notification 444 and the confirmation notification 446 similarly.

The proximity module 626 can calculate the communication proximity 448 based on the transmission time 450 for the packet type 430. For example, the transmission speed 452 of FIG. 4 for the packet type 430 of a sound wave can be 343.2 meters per second. Based on the transmission speed 452 and the transmission time 450, the proximity module 626 can calculate for the communication proximity 448. The proximity module 626 can send the communication proximity 448 to the intent module 608, the packet module 610, or a combination thereof.

For illustrative purposes, the computing system 100 is described with the intent module 608 detecting the transfer intent 402, although it is understood that the intent module 608 can operate differently. For example, the intent module 608 can update the transfer intent 402 based on the communication proximity 448. After determining the communication proximity 448, the intent module 608 can determine that the source device 202 and the target device 206 are no longer within the transfer proximity 424. As a result, the intent module 608 can determine that the user of the computing system 100 has no longer the transfer intent 402 to invoke the state transfer 210.

For illustrative purposes, the computing system 100 is described with the modulation module 614 determining the transfer modulation 432, although it is understood that the modulation module 614 can operate differently. For example, the modulation module 614 can update the transfer modulation 432 based on the communication proximity 448. More specifically, based on the communication proximity 448, the modulation module 614 can update the modulation scheme 434 to increase or decrease the modulation frequency 436, the modulation amplitude 438, or a combination thereof to improve the detection between the source device 202 and the target device 206 within the transfer context 414.

The computing system 100 can include the access authorization module 624, which can couple to the transmission module 616. The access authorization module 624 determines the device authorization 238 of FIG. 2. For example, the access authorization module 624 can determine the device authorization 238 for invoking the state transfer 210 between the source device 202 and the target device 206 after receiving the confirmation notification 446.

The access authorization module 624 can determine the device authorization 238 in a number of ways. For example, the access authorization module 624 can determine the device authorization 238 based on the user identification 228 of FIG. 2. More specifically, if the source device 202 and the target device 206 are registered on the same instance of the user identification 228, the access authorization module 624 can determine the device authorization 238 of "authorized" to initiate the state transfer 210. If not, the access authorization module 624 can determine the device authorization 238 of "unauthorized."

For a different example, the access authorization module 624 can determine the device authorization 238 based on the device identification 230 of FIG. 2. More specifically, if the device identification 230 for the source device 202 and the device identification 230 for the target device 206 are both registered for the state transfer 210, the access authorization module 624 can determine the device authorization 238 of "authorized" to initiate the state transfer 210. If not, the access authorization module 624 can determine the device authorization 238 of "unauthorized."

For a different example, the access authorization module 624 can determine the device authorization 238 based on the group identification 232 of FIG. 2. More specifically, if the source device 202 and the target device 206 are both registered within the same instance of the group identification 232, the access authorization module 624 can determine the device authorization 238 of "authorized" to initiate the state transfer 210. If not, the access authorization module 624 can determine the device authorization 238 of "unauthorized." The access authorization module 624 can send the device authorization 238 to a state module 628. The access manager module 236 of FIG. 2 can include the access authorization module 624.

The computing system 100 can include the state module 628, which can couple to the access authorization module 624. The state module 628 executes the state transfer 210. For example, the state module 628 can execute the state transfer 210 based on the device authorization 238 for transferring the object state 214 from the source device 202 to the target device 206.

The physical transformation for calculating the communication proximity 448 results in the movement in the physical world, such as people using the first device 102, based on the operation of the computing system 100. As the movement in the physical world occurs, the movement itself creates additional information that is converted back into generating the transfer modulation 432 for the continued operation of the computing system 100 and to continue movement in the physical world.

The first software 526 of FIG. 5 of the first device 102 of FIG. 5 can include the computing system 100. For example, the first software 526 can include the activity module 602, the context module 604, the sensitivity module 606, the intent module 608, the packet module 610, the transmission module 616, the access authorization module 624, and the state module 628.

The first control unit 512 of FIG. 5 can execute the first software 526 for the activity module 602 to determine the object activity 336. The first control unit 512 can execute the first software 526 for the context module 604 to determine the transfer context 414. The first control unit 512 can execute the first software 526 for the sensitivity module 606 to determine the sensitivity level 422. The first control unit 512 can execute the first software 526 for the intent module 608 to detect the transfer intent 402.

The first control unit 512 can execute the first software 526 for the packet module 610 to determine the packet type 430, generate the transfer modulation 432, or a combination thereof. The first control unit 512 can execute the first software 526 for the transmission module 616 to send the initiation notification 442, the reply notification 444, the confirmation notification 446, or a combination thereof. The first control unit 512 can execute the first software 526 for the access authorization module 624 to determine the device authorization 238. The first control unit 512 can execute the first software 526 for the state module 628 to initiate the state transfer 210.

The second software 542 of FIG. 5 of the second device 106 of FIG. 5 can include the computing system 100. For example, the second software 542 can include the activity module 602, the context module 604, the sensitivity module 606, the intent module 608, the packet module 610, the transmission module 616, the access authorization module 624, and the state module 628.

The second control unit 534 of FIG. 5 can execute the second software 542 for the activity module 602 to determine the object activity 336. The second control unit 534 can execute the second software 542 for the context module 604 to determine the transfer context 414. The second control unit 534 can execute the second software 542 for the sensitivity module 606 to determine the sensitivity level 422. The second control unit 534 can execute the second software 542 for the intent module 608 to detect the transfer intent 402.

The second control unit 534 can execute the second software 542 for the packet module 610 to determine the packet type 430, generate the transfer modulation 432, or a combination thereof. The second control unit 534 can execute the second software 542 for the transmission module 616 to send the initiation notification 442, the reply notification 444, the confirmation notification 446, or a combination thereof. The second control unit 534 can execute the second software 542 for the access authorization module 624 to determine the device authorization 238. The second control unit 534 can execute the second software 542 for the state module 628 to initiate the state transfer 210.

The third software 566 of FIG. 5 of the third device 108 of FIG. 5 can include the computing system 100. For example, the third software 566 can include the activity module 602, the context module 604, the sensitivity module 606, the intent module 608, the packet module 610, the transmission module 616, the access authorization module 624, and the state module 628.

The third control unit 552 of FIG. 5 can execute the third software 566 for the activity module 602 to determine the object activity 336. The third control unit 552 can execute the third software 566 for the context module 604 to determine the transfer context 414. The third control unit 552 can execute the third software 566 for the sensitivity module 606 to determine the sensitivity level 422. The third control unit 552 can execute the third software 566 for the intent module 608 to detect the transfer intent 402.

The third control unit 552 can execute the third software 566 for the packet module 610 to determine the packet type 430, generate the transfer modulation 432, or a combination thereof. The third control unit 552 can execute the third software 566 for the transmission module 616 to send the initiation notification 442, the reply notification 444, the confirmation notification 446, or a combination thereof. The third control unit 552 can execute the third software 566 for the access authorization module 624 to determine the device authorization 238. The third control unit 552 can execute the third software 566 for the state module 628 to initiate the state transfer 210.

The computing system 100 can be partitioned between the first software 526, the second software 542, and the third software 566. For example, the second software 542 can include the activity module 602, the context module 604, the sensitivity module 606, the intent module 608, and the packet module 610. The second control unit 534 can execute modules partitioned on the second software 542 as previously described.

The first software 526 can include the state module 628, the access authorization module 624, and the initiation module 618 and the confirmation module 622 of the transmission module 616. Based on the size of the first storage unit 514 of FIG. 5, the first software 526 can include additional modules of the computing system 100. The first control unit 512 can execute the modules partitioned on the first software 526 as previously described.

The third software 566 can include the reply module 620 of the transmission module 616. Based on the size of the third storage unit 554, the third software 566 can include additional modules of the computing system 100. The third control unit 552 can execute the modules partitioned on the third software 566 as previously described.

The computing system 100 describes the module functions or order as an example. The modules can be partitioned differently. For example, the access authorization module 624 and the state module 628 can be combined. Each of the modules can operate individually and independently of the other modules. Furthermore, data generated in one module can be used by another module without being directly coupled to each other. For example, transmission module 616 can receive the object activity 336 from the activity module 602.

The modules described in this application can be hardware circuitry, hardware implementation, or hardware accelerators in the first control unit 512, the third control unit 552, or in the second control unit 534. The modules can also be hardware circuitry, hardware implementation, or hardware accelerators within the first device 102, the second device 106, or the third device 108 but outside of the first control unit 512, the second control unit 534, or the third control unit 552, respectively.

The modules described in this application can be stored in a non-transitory computer readable medium. The first storage unit 514 of FIG. 5, the second storage unit 546 of FIG. 5, the third storage unit 554 of FIG. 5, or a combination thereof can represent the non-transitory computer readable medium. The first storage unit 514, the second storage unit 546, the third storage unit 554, or a combination thereof or a portion thereof can be removable from the first device 102 of FIG. 5, the second device 106 of FIG. 5, or the third device 108 of FIG. 5. Examples of the non-transitory computer readable medium can be a non-volatile memory card or stick, an external hard disk drive, a tape cassette, or an optical disk.

Figure 7:
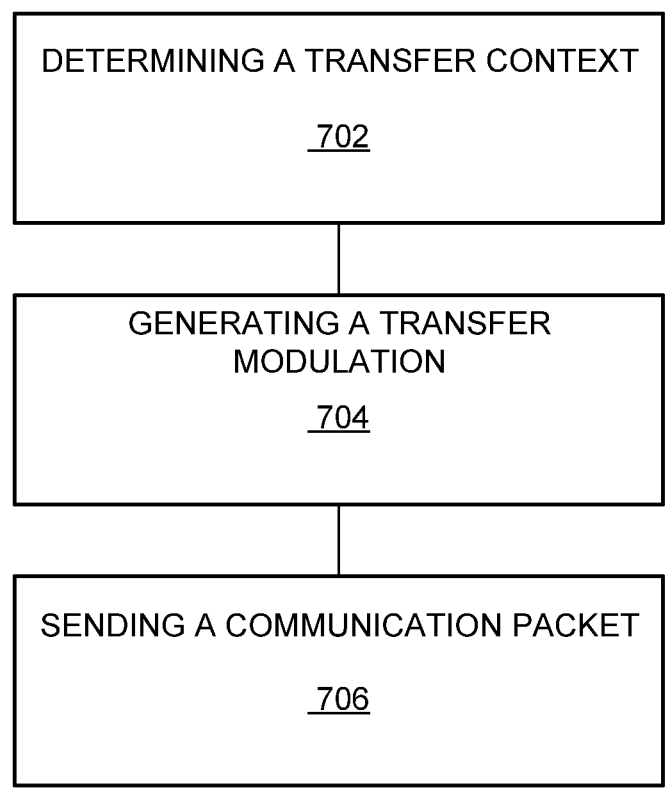
FIG. 7 is a flow chart of a method of operation of a computing system in an embodiment of the present invention.

Referring now to FIG. 7, therein is shown a flow chart of a method 700 of operation of a computing system 100 in an embodiment of the present invention. The method 700 includes: determining a transfer context for invoking a state transfer between a source device and a target device in a block 702; generating a transfer modulation with a control unit based on the transfer context for adjusting to a modulation scheme suited for the transfer context in a block 704; and sending a communication packet based on the transfer modulation for detecting the source device and the target device in a block 706.

It has been discovered that the computing system 100 determining the transfer context 414 of FIG. 4 for the state transfer 210 of FIG. 2 can improve the efficiency of transferring the object state 214 of FIG. 2 from the source device 202 of FIG. 2 to the target device 208 of FIG. 2. By determining the transfer context 414, the computing system 100 can generate the transfer modulation 432 of FIG. 4 for sending the communication packet 304 of FIG. 3 to detect the source device 202, the target device 206 of FIG. 2, or a combination thereof. As a result, the computing system 100 can determine the device authorization 238 of FIG. 2 to invoke the state transfer 210 between the source device 202 and the target device 206.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a control unit configured to:
   determine a transfer context for invoking a state transfer between a source device and a target device,
   detect a transfer intent based on a communication proximity within a transfer proximity, the communication proximity calculated as a transmission time for exchanging a communication packet of a notification type between the source device and the target device based on a transmission speed of the communication packet,
   determine a packet type based on the transfer context for selecting the packet type suited for detecting the source device, the target device, or a combination thereof,
   generate a transfer modulation based on the packet type for adjusting to a modulation scheme suited for the transfer context, wherein the transfer modulation includes either one of a modulation frequency below a specified frequency and above the specified frequency, and wherein the modulation frequency is determined by the surrounding noise level, and
   a communication interface, coupled to the control unit, configured to send a communication packet based on the transfer modulation, the transfer intent, or a combination thereof for detecting the source device and the target device.

2. The system as claimed in claim 1 wherein the communication interface is configured to send instances of the communication packet with at least two different instances of the transfer modulation.

3. The system as claimed in claim 1 communication interface is configured to send a reply notification, an initiation notification, a confirmation notification, or a combination thereof.

4. The system as claimed in claim 1 wherein the control unit is configured to generate the transfer modulation based on a modulation frequency, a modulation amplitude, or a combination thereof.

5. The system as claimed in claim 1 wherein the control unit is configured to generate the transfer modulation based on an urgency level of the transfer context for adjusting the modulation scheme.

6. The system as claimed in claim 1 wherein the control unit is configured to generate the transfer modulation based on a reliability level of the transfer context for adjusting the modulation scheme.

7. The system as claimed in claim 1 wherein the control unit is configured to generate the transfer modulation based on a sensitivity level of an object for adjusting the modulation scheme.

8. The system as claimed in claim 1 wherein the control unit is configured to determine a transfer intent for a transfer type based on a user's behavior for invoking the state transfer.

9. The system as claimed in claim 1 wherein the control unit is configured to determine a transfer intent based on a device state for invoking the state transfer.

10. The system as claimed in claim 1 wherein the control unit is configured to determine the packet type based on the transfer proximity for selecting the packet type suited for sending the communication packet between the source device and the target device.

11. A method of operation of a computing system comprising:
    determining a transfer context for invoking a state transfer between a source device and a target device;
    detecting a transfer intent based on a communication proximity within a transfer proximity, the communication proximity calculated as a transmission time for exchanging a communication packet of a notification type between the source device and the target device based on a transmission speed of the communication packet, determining a packet type based on the transfer context for selecting the packet type suited for detecting the source device, the target device, or a combination thereof;

generating a transfer modulation with a control unit based on the packet type for adjusting to a modulation scheme suited for the transfer context, wherein the transfer modulation includes either one of a modulation frequency below a specified frequency and above the specified frequency, and wherein the modulation frequency is determined by the surrounding noise level, and sending a communication packet based on the transfer modulation, the transfer intent, or a combination thereof for detecting the source device and the target device.

12. The method as claimed in claim 11 wherein sending the communication packet includes sending instances of the communication packet with at least two different instances of the transfer modulation.

13. The method as claimed in claim 11 wherein sending the communication packet includes sending a reply notification, an initiation notification, a confirmation notification, or a combination thereof.

14. The method as claimed in claim 11 wherein generating the transfer modulation includes generating the transfer modulation based on a modulation frequency, a modulation amplitude, or a combination thereof.

15. The method as claimed in claim 11 wherein determining the packet type includes determining the packet type based on the transfer proximity for selecting the packet type suited for sending the communication packet between the source device and the target device.

16. A non-transitory computer readable medium including process for execution, the process comprising:

determining a transfer context for invoking a state transfer between a source device and a target device;

detecting a transfer intent based on a communication proximity within a transfer proximity, the communication proximity calculated as a transmission time for exchanging a communication packet of a notification type between the source device and the target device based on a transmission speed of the communication packet, determining a packet type based on the transfer context for selecting the packet type suited for detecting the source device, the target device, or a combination thereof;

generating a transfer modulation based on the packet type for adjusting to a modulation scheme suited for the transfer context, wherein the transfer modulation includes either one of a modulation frequency below a specified frequency and above the specified frequency, and wherein the modulation frequency is determined by the surrounding noise level, sending a communication packet based on the transfer modulation, the transfer intent, or a combination thereof for detecting the source device and the target device; and determining a device authorization based on the communication packet for executing the state transfer between the source device and the target device.

17. The non-transitory computer readable medium as claimed in claim 16 wherein generating the transfer modulation includes generating the transfer modulation based on an urgency level of the transfer context for adjusting the modulation scheme.

18. The non-transitory computer readable medium as claimed in claim 16 wherein generating the transfer modulation includes generating the transfer modulation based on a reliability level of the transfer context for adjusting the modulation scheme.

19. The non-transitory computer readable medium as claimed in claim 16 wherein generating the transfer modulation includes generating the transfer modulation based on a sensitivity level of an object for adjusting the modulation scheme.

20. The non-transitory computer readable medium as claimed in claim 16 further comprising determining a transfer intent for a transfer type based on a user's behavior for invoking the state transfer.

* * * * *